2 Sheets—Sheet 1.
B. J. LA MOTHE.
METALLIC CAR FRAME AND PLATFORM.
No. 7,768. Reissued June 26, 1877.
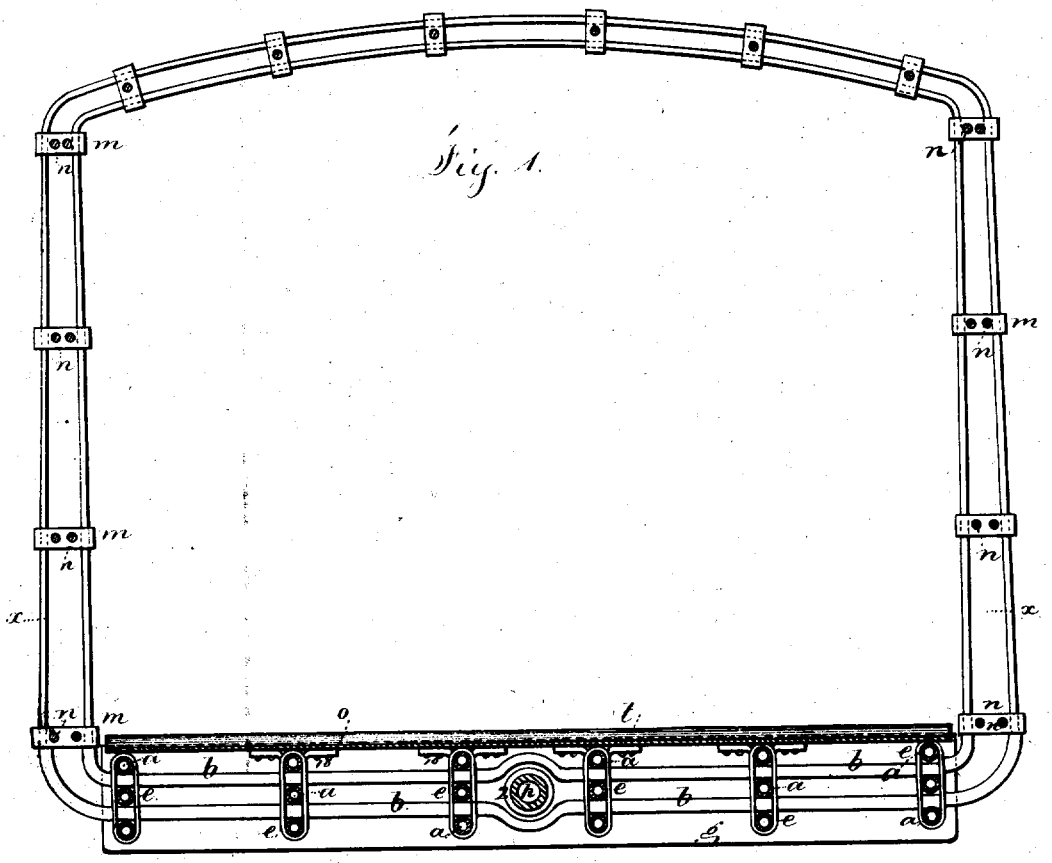
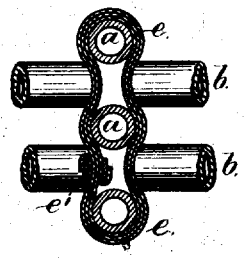
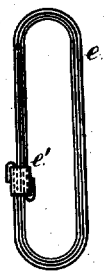
Witnesses
Chas H. Smith
Harold Serrell
Inventor.
Bernard J. La Mothe
per Lemuel W. Serrell
Atty.

2 Sheets—Sheet 2.

B. J. LA MOTHE.

METALLIC CAR FRAME AND PLATFORM.

No. 7,768. Reissued June 26. 1877.

Witnesses
Chas. H. Smith
Harold Serrell

Inventor
Bernard J. La Mothe.
per Lemuel W. Serrell
Atty

UNITED STATES PATENT OFFICE.

BERNARD J. LA MOTHE, OF NEW YORK, N. Y.

IMPROVEMENT IN METALLIC CAR FRAMES AND PLATFORMS.

Specification forming part of Letters Patent No. 185,446, dated December 19, 1876; reissue No. 7,768, dated June 26, 1877; application filed May 17, 1877.

*To all whom it may concern:*

Be it known that I, BERNARD J. LA MOTHE, of the city and State of New York, have invented an Improvement in Metallic Cars, of which the following is a specification:

In Letters Patent No. 105,699, heretofore granted to me, metallic car-frames are described in which the tubes or bars are united together by metallic intersection-blocks having holes through them for said tubes or bars, and there were two or three tubes or bars running in one direction, and one or two tubes or bars running in the other direction.

The present invention relates to a peculiar construction of intersection-block, whereby the number of tubes or bars running in one direction corresponds to the number running in the other direction, so as to obtain uniformity of strength transversely and longitudinally of the car, which is very essential in adapting the car to the various circumstances under which it is placed. I also employ intersection-blocks of varying lengths, in order that the tubes or rods may diverge or converge between one block and the next, and thereby there will be a slight bend produced at the intersection-blocks, in consequence of the holes in such blocks being parallel. I construct the platform so as to obtain great strength with lightness, by the use of tubes that extend from end to end of the platform; and these are combined with transverse tubes passing between the longitudinal tubes, and which also connect with the tubes or rods forming the upper part of the box or platform car, and employ a draft-bar that is connected to the metallic platform by a coiled spring, that serves also as a buffer-spring.

Figure 3:
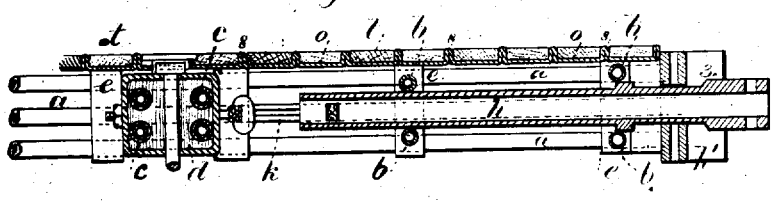
Figure 2:
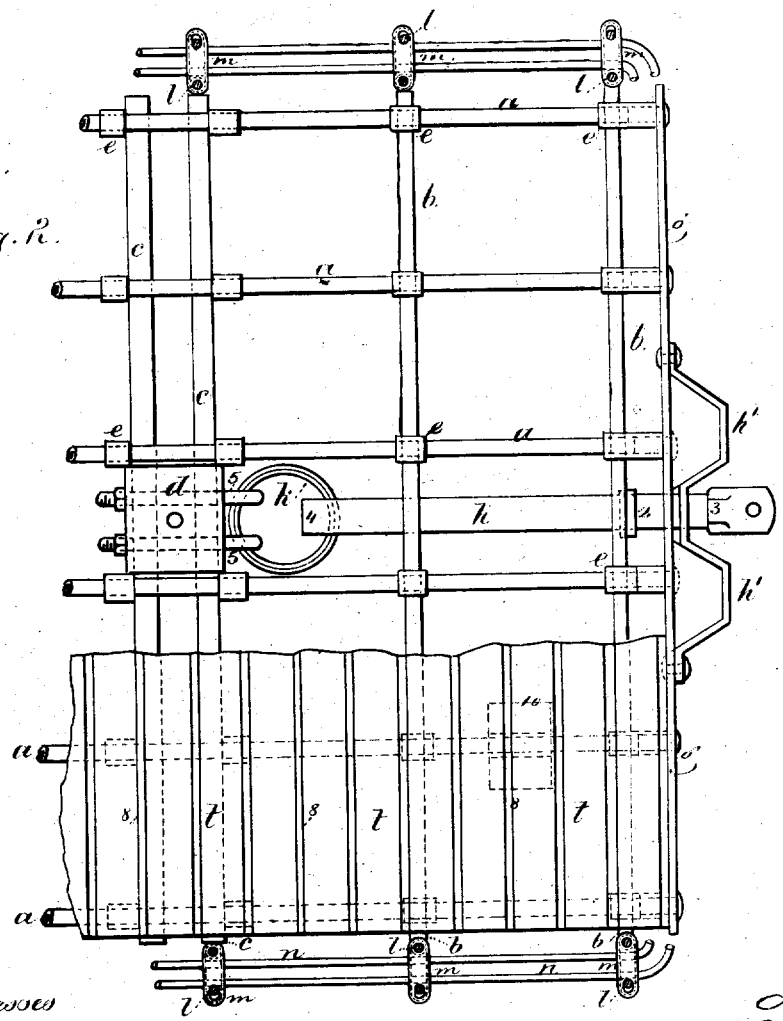

In the drawing, Figure 1 is a vertical cross-section of the car-frame. Fig. 2 is a plan below the line *x x*, and Fig. 3 is a section through the transom-beam. Fig. 4 is a section of the attaching-strap, and Fig. 5 is an elevation of the same.

The tubes *a a* pass longitudinally of the platform, and the tubes or bars *b b* run transversely. The tubes *c c* form the transom-beam, between which tubes is the block *d*, that receives the king-bolt of the truck. Said block *d* is retained by metallic bands, wrapped around it and the adjacent tubes *c c*. The longitudinal and transverse tubes intersect each other, and they are tied together by means of metal straps *e e*, that are of flat strips of sheet metal, wound into a coil of the proper size, and the ends secured by passing them through the flat band or ring *e'*, and turning the ends over. These straps *e* are driven upon the groups of tubes contiguous to the intersections, so as to bind them tightly together, and the tubes may be slightly flattened at such intersections, to cause them to set together more firmly.

This mode of constructing the platform is preferable to that shown in my former patent, No. 105,699, because the wrought-iron bands hold the tubes or bars in direct contact, one with the other, and allow for the introduction of larger tubes, or a greater number of them, without increasing the thickness of the platform-frame.

At the end of the car the tubes pass through the plate *g*, and are expanded so as to retain the plate firmly in position. The draft-bar *h* passes through this plate *g*. It is provided with any suitable head or coupling between the buffer-blocks *h'*, and the movement of the draft-bar is limited by the collars 2 and 3, so that the spring *k* is not unduly strained in either direction. This spring *k* is a coil of steel wire of suitable size, and it is connected by a strap, 4, with the inner end of the draft bar, or by the end of the draft-bar forming such strap, and by a strap, 5, with the king-bolt block *d*, or the tubes *c* of the transom-beam.

The tension upon the draft-bar elongates the circular spring-coil *k* into an ellipse longitudinally of the car, and compression upon such draft-bar spreads the spring *k* into an elliptical form transversely of the car.

A platform constructed as aforesaid can be used for a flat or platform car; or it can be provided with the upper portions, next described, to form a box or passenger car.

The vertical rods or tubes *l* are connected with the transverse tubes of the platform, and they are bent to give them the vertical position shown, and they pass through the intersection-blocks *m*, and these blocks *m* vary in length, as shown, so that the rods *l* converge or diverge at the respective sides of such blocks, and hence bind in the parallel holes of the intersection-blocks, and lessen the risk of such blocks slipping or becoming displaced upon the said rods or tubes *l*.

In my reissued patent, No. 1,364, the tubes are closer together in the upper part of the car than at the lower parts of the sides; but there are not the perforated tie-blocks aforesaid; hence there is not any binding action upon the tubes or rods in the holes.

Instead of the horizontal tubes or rods *n* alternating with the tubes or rods *l*, I place both the rods *n* between the rods *l*, or vice versa, and the intersection-blocks are made accordingly, so that the same number of transverse and longitudinal tubes or rods can be employed at each intersection to obtain uniformity of strength, and to facilitate the introduction of the sheet-metal covering or filling-sheets, or wood-work that incloses the sides of the car.

I make use of a compound flooring to the car, whereby the floor is rendered strong, and the connection of the planks to the metallic frame of the platform is facilitated.

The sheets of metal *o* are folded to form the vertical ribs 8 8, that are double and at a distance apart corresponding to the width of the floor-planks. These sheets are attached to the tubes of the platform by bands and rivets 10, (see Fig. 1,) and then the floor-planks *t* are forced into the spaces between the ribs 8 8, and secured by wood-screws or bolts inserted from below through the said sheet-metal floor.

This construction renders the floor very durable and strong, and prevents the flooring being broken up in case of collision, and in case of injury to the wood of the floor the metal bottom will prevent the leakage of grain or other material which may be in the car.

I claim as my invention—

1. The metallic car-platform, made of longitudinal and transverse tubes or rods secured together at the intersections by wrought-iron bands, in the manner specified.

2. The combination, in a metallic car-platform, of longitudinal tubes and transverse tubes connected together at the points of intersection, substantially as set forth.

3. The band *e*, for securing the tubes or rods *a* and *d*, made of a strip of sheet metal, wound up and retained at its ends by the band *e'*, as and for the purposes set forth.

4. The plate *g* at the end of the car-platform, retained upon the longitudinal tubes *a* by such tubes being passed through the said plate and spread, in combination with the transverse tubes *b* of the platform, as set forth.

5. The combination, with the draft-bar of a car having a movement limited by the stops 2 and 3, of the spring formed of a circular coil of wire or band metal, and the straps 4 and 5, that pass around the convolutions at opposite sides of the circle, and connect the same together and to the draft-bar and car, respectively, substantially as set forth.

6. The bars or tubes *l*, in combination with the intersection-blocks *m*, of varying length, placed together so that the said bars *l* or tubes *n* converge or diverge, as and for the purposes set forth.

7. The two bars or tubes *n*, passing through between the two bars or tubes *l*, in combination with the intersection-blocks *m*, that are made to receive and sustain such bars or tubes, in the manner and for the purposes set forth.

8. The metallic plate *o*, folded to form double longitudinal ribs 8, in combination with the flooring-planks *t*, inserted between said ribs and secured, as set forth.

Signed by me this 6th day of April, A. D. 1877.

B. J. LA MOTHE.

Witnesses:
GEO. D. WALKER,
GEO. T. PINCKNEY.